United States Patent [19]

Mammone

[11] Patent Number: 4,571,411

[45] Date of Patent: Feb. 18, 1986

[54] HYBRID COMPOSITE OF POLY(P-PHENYLENE-TRANS-BISBENZO-THIAZOLE) AND CERAMIC FIBER

[75] Inventor: Joseph F. Mammone, Cinnaminson, N.J.

[73] Assignee: E. I. Du Pont de Nemours and Company, Wilmington, Del.

[21] Appl. No.: 695,874

[22] Filed: Jan. 25, 1985

[51] Int. Cl.[4] ............................................. C08K 3/22
[52] U.S. Cl. ................................... 523/457; 523/514; 523/220; 524/430
[58] Field of Search ............... 523/457, 514; 524/430, 524/437

[56] References Cited

U.S. PATENT DOCUMENTS 3,556,922  1/1980  Green et al. ...................... 161/156
3,996,145  12/1976  Hepburn ............................ 524/430
4,174,331  11/1979  Myles ................................ 524/430

OTHER PUBLICATIONS

Macromolecules 1981 14, pp. 1135–1138.
Product Licensing Index, Dec., 1971, pp. 146–148.
Product Licensing Index, Jul., 1972, pp. 56–57.

*Primary Examiner*—Lewis T. Jacobs

[57] ABSTRACT

Improved organic matrix composites are made from polycrystalline alumina ceramic fiber and poly(p-phenylene-trans-bisbenzothiazole).

4 Claims, 1 Drawing Figure

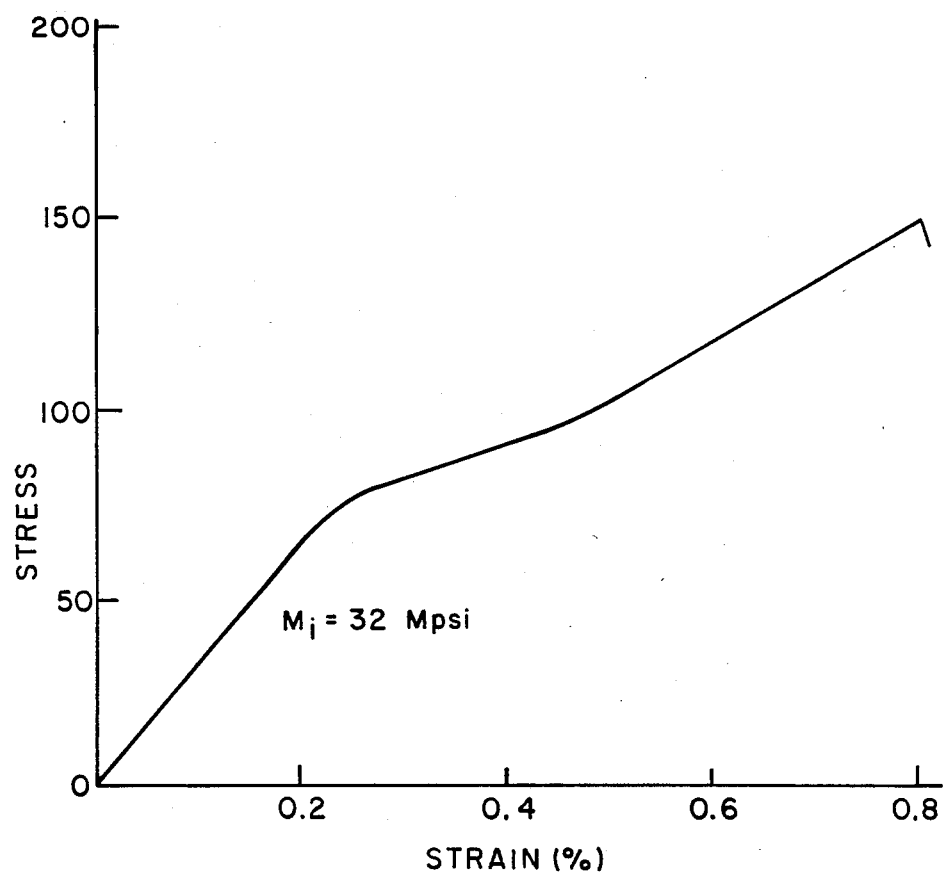
FIGURE

HYBRID COMPOSITE OF POLY(P-PHENYLENE-TRANS-BISBENZO-THIAZOLE) AND CERAMIC FIBER

The Government has rights in this invention pursuant to Contract No. F-33615-81-C-5148 awarded by the Department of the Air Force, Department of Defense.

BACKGROUND OF THE INVENTION

Improved fiber-reinforced composites comprising a matrix resin and a combination of organic and inorganic fibrous materials are known to the art (Product Licensing Index December 1971, pages 146–148). Such composites often exhibit better flexural and impact properties as compared with composites containing only the more brittle of the fibrous materials. The use for composite reinforcement of a combination of fibers such as high modulus crystalline ceramic fiber (Fiber FP ®, E. I. du Pont de Nemours and Company) with aromatic polyamide fiber is also known. In such composites, the inorganic fiber fails at a relatively low stress level, after which the organic fiber continues to bear the load on its own. The present invention overcomes this deficiency and greatly extends the level to which both fibers bear the load before the inorganic fiber fails.

SUMMARY OF THE INVENTION

This invention provides a composite comprising an organic polymer matrix resin and as reinforcement, a combination of aligned continuous filaments of high modulus polycrystalline alumina ceramic fiber and continuous filaments of poly(p-phenylene-trans-bisbenzothiazole) (PBT).

DESCRIPTION OF THE DRAWINGS

The FIGURE is a stress-strain curve of an epoxy matrix composite reinforced with 36 volume percent PBT filaments and 23 volume percent filaments of alumina.

DETAILED DESCRIPTION OF THE INVENTION

The composites of the invention comprise an organic polymer matrix resin reinforced with a combination of high modulus polycrystalline alumina ceramic fiber and PBT fiber. The ceramic fiber is employed as continuous filaments. The term polycrystalline alumina ceramic is intended to include minor amounts of other refractory oxides which may be present as separate phases or as solid solutions with the alumina. Other oxides which are not considered refractory oxides may be present in amount that do not reduce the melting point of the final fiber below 1000° C. The inorganic fiber should have a tensile strength of at least 100 thousand pounds per square inch (Kpsi) and a tensile modulus of at least 40 million pounds per square inch (Mpsi). Suitable fibers are described in U.S. Pat. Nos. 3,808,015; 3,849,181 and in other prior art.

The PBT fiber is employed in continuous filament form and can be prepared according to the process of U.S. Pat. Nos. 3,556,922 or 4,225,700. For use in the present invention, PBT fiber is heat treated under tension. Useful products have a tensile strength of at least 22 gpd and a tensile modulus of at least 1900 gpd.

The combination of PBT and ceramic fiber is used for composite reinforcement in the form of tows, strands, plied yarn, etc. In the combination, the PBT fiber will generally constitute from about 20 to 80 volume % and preferably the PBT fiber is present in the proportion of 40 to 70%. The arrangement of the reinforcement within the composite may vary considerably, however, both the ceramic and PBT fibers should be similarly aligned in the composite so that both can bear the tensile load to the fullest extent.

A wide variety of thermosetting and thermoplastic polymer matrices can be used in preparing the composites. Useful thermosetting matrices include phenolic, polyester, epoxy, polybenzimidazole, polyimide and other thermosetting resins. Useful thermoplastic matrices include polycarbonates, polyamides, polyesters, etc.

Any of the well known prior art techniques can be used for preparation of the composites. For example, continuous PBT and ceramic filaments can be impregnated by passage through a liquid resin before lay-up in the wet state. Another useful technique is preparing a prepreg by cowinding tows of the PBT and ceramic fiber on a drum and solution impregnating the fibers with an epoxy resin. The prepreg is then dried in a vacuum oven to drive off volatiles, trimmed, layed up in a mold and a laminate formed therefrom under elevated temperatures and pressures. The reinforcement generally comprises between 40 and 70, preferably about 60 volume percent of the composite.

The composites of this invention are particularly useful where high electrical conductivity is not desired. The ceramic fiber has relatively low tenacity and is brittle. However, it increases the compressive strength of PBT reinforced composites to a useful level for structural applications while maintaining an extremely high degree of stiffness.

The stress-strain curve of the hybrid composite prepared in the Example below is shown in the FIGURE. At abot 0.25% tensile strain the ceramic fiber begins to fail as shown by the break in the curve. Up to this point both fibers have been bearing a significant portion of the load because of their modulus match. Use of lower modulus organic fiber would result in failure of the ceramic fiber at a much lower stress level.

EXAMPLE

Alumina fibers (Fiber FP ®, E. I. du Pont de Nemours and Company) that are 20 microns in diameter, 200 kpsi tensile strength, and 55 Mpsi tensile modulus were used. PBT may be prepared by the technique described in Wolfe U.S. Pat. No. 4,225,700. Spinning of the polymer may be achieved through use of the process and apparatus described in *Macromolecules* 1981, 14, 1135–1138, published by the American Chemical Society. In order to develop the high tensile properties, the spun PBT yarn was subjected to a tensioned heat treatment. For heat treatment of the PBT yarn, a 3-foot long temperature tube furnace was constructed by placing a 1" ID ceramic tube inside three 1-foot Lindberg tube furnaces in series. Each furnace was separately controlled with a thermocouple placed in the treatment zone. The tube (volume=0.7 l.) was purged with a continuous flow of nitrogen (10 l. per minute) monitored with a flow meter. Tension was applied to the yarn with magnetic hysteresis brakes (GE Model CR9540-AA401AA) placed in series. The brakes have constant torque ratings regardless of the rate of shaft rotation (i.e., yarn speed). The PBT yarn was heat treated in nitrogen with the ovens controlled at 690° C., at a yarn speed of 3 feet per minute (1 minute oven residence time), and a yarn tension of 1.2 gpd. The PBT fiber thus prepared had a tensile strength of 27 gpd and tensile modulus of 2280 gpd. Impregnated hybrid tapes of coaligned PBT and alumina fiber were prepared by cowinding continuous lengths of the two yarns. The PBT yarn denier was 1100 and the alumina fiber yarn denier was 1750. The fibers were wound onto a drum from which tapes of desired lengths could be cut. While being cowound, the fibers were impregnated with epoxy resin (Hercules 3501-6) that was dissolved in a volatile solvent (methylene chloride), which is easily driven off.

Undirectional composite bars were fabricated in a 6"×1.25" open-ended mold. Impregnated tapes were stacked in the mold and the mold was closed. The mold was placed in an evacuated aluminum can and then cured using the platens of a heated press. The mold in the evacuated can was heated from room temperature to 116° C. over a period of 60 minutes. The composite was then subjected to 75 psi pressure to consolidate the laminate. The composite was then held at 116° C. for 60 minutes. The composite was heated from 116° C. to 177° C. over a period of 60 minutes and then held at 177° C. for another 60 minutes under 75 psi pressure. The system was then cooled back down to room temperature over a period of 2 hours and the laminate removed. The hybrid composite thus formed contained a volume fraction of 36 and 23% of PBT and alumina (Du Pont Fiber FP ®) fiber, respectively.

The stress strain curve of the hybrid composite tested in tension is shown in the FIGURE. The initial modulus is 32 Mpsi and the tensile strength is 150 kpsi. The compression strength is 100 kpsi, which reflects a 233% improvement over the compressive strength of a PBT/epoxy composite.

Test Procedures

Compressive strength (psi) is the maximum compressive stress (pounds) divided by the composite cross-section. Compressive stress was measured using the IITRI fixture described in *Journal of Testing and Evaluation, JTEVA*, Vol. 5, No. 4, July 1977, pp. 278–283.

Tensile properties were measured by methods described in ASTM D3039. Test coupons were 6" long and 0.5" wide: 1.5" aluminum tabs were mounted at each end.

What is claimed is:

1. A composite comprising an organic polymer matrix resin reinforced with a combination of aligned continuous filaments of high modulus polycrystalline alumina ceramic fiber and poly(p-phenylene-transbisbenzothiazole) fiber.

2. The composite of claim 1 wherein the combination of fiber constitutes between 40 and 70 volume % of the composite.

3. The composite of claim 2 wherein the poly(p-phenylene-trans-bisbenzothiazole) fiber constitutes from about 20 to 80 volume percent of the fiber combination.

4. The composite of claim 1 wherein the matrix resin is an epoxy resin.

* * * * *